Nov. 29, 1955   H. C. HUEFFED ET AL   2,725,488
SERIES-PARALLEL SWITCH AND BATTERY CIRCUIT
Filed Oct. 3, 1951   3 Sheets-Sheet 1
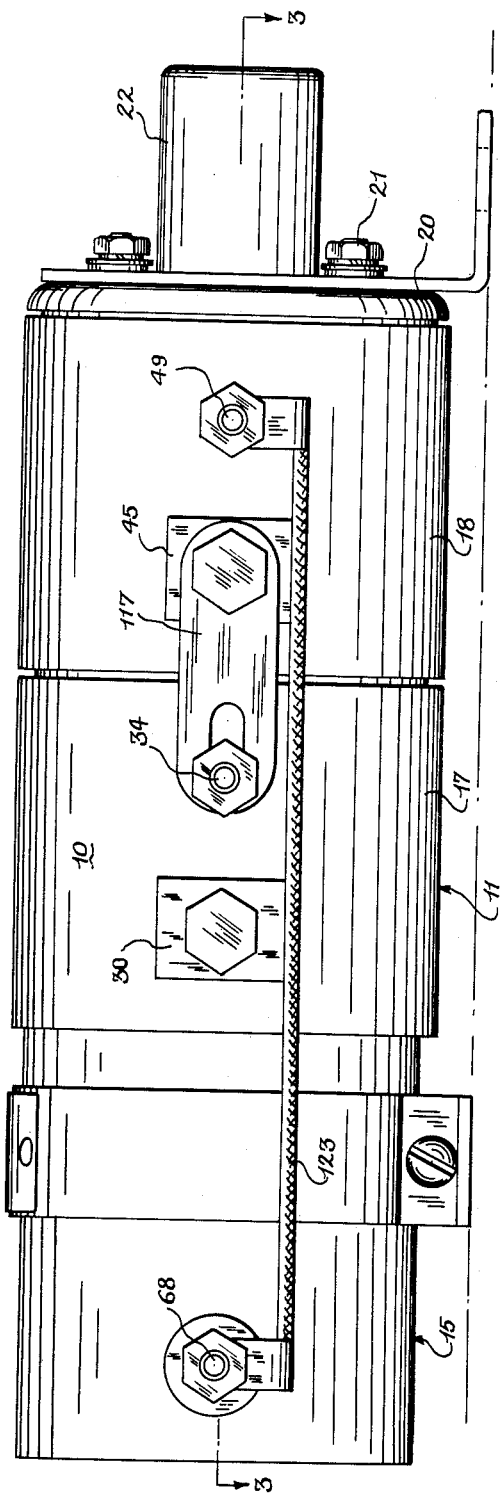
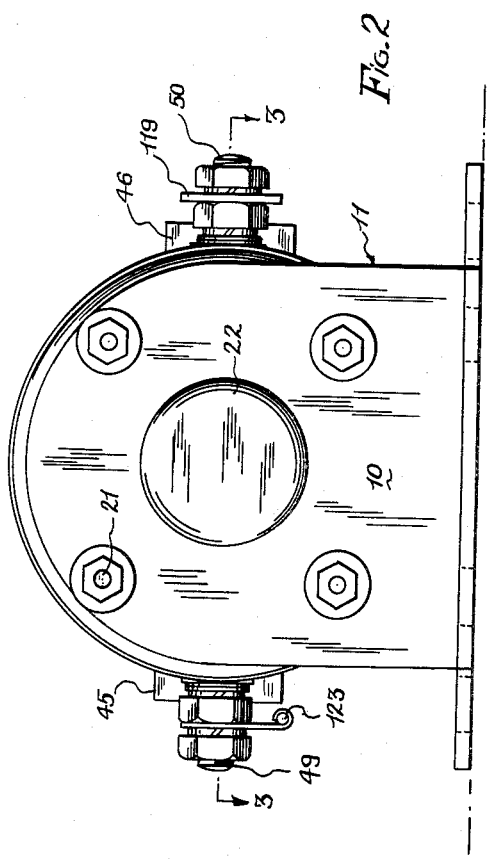
INVENTORS
HOMER C. HUEFFED
BY ELMER P. ORVIS
Hudson, Boughton,
Williams, David & Hoffmann.
ATTORNEYS Nov. 29, 1955   H. C. HUEFFED ET AL   2,725,488
SERIES-PARALLEL SWITCH AND BATTERY CIRCUIT
Filed Oct. 3, 1951   3 Sheets-Sheet 2

INVENTORS
HOMER C. HUEFFED
BY ELMER P. ORVIS
Hudson Boughton
Williams, David & Hoffmann
ATTORNEYS Nov. 29, 1955   H. C. HUEFFED ET AL   2,725,488
SERIES-PARALLEL SWITCH AND BATTERY CIRCUIT
Filed Oct. 3, 1951   3 Sheets-Sheet 3

INVENTORS
HOMER C. HUEFFED
BY ELMER P. ORVIS
Hudson, Boughton,
Williams, David & Hoffmann
ATTORNEYS

United States Patent Office 2,725,488
Patented Nov. 29, 1955

2,725,488

SERIES-PARALLEL SWITCH AND BATTERY CIRCUIT

Homer C. Hueffed, Berea, and Elmer P. Orvis, Bay Village, Ohio, assignors to The Leece-Neville Company, Cleveland, Ohio, a corporation of Ohio Application October 3, 1951, Serial No. 249,464

3 Claims. (Cl. 307—48)

This invention relates to electric battery charging and discharging and, as its principal object, aims to provide a novel switch device and circuit by which a plurality of batteries can be charged in a parallel connected relation and discharged in a series connected relation.

Series-parallel switches and battery circuits have been proposed heretofore and have frequently been embodied in vehicle electrical systems which include an engine cranking motor, but in all such series-parallel arrangements which have come to our attention two separate switch devices have been used. One of these two switch devices has usually been a magnetic contactor for closing the energizing circuit for the cranking motor in response to the push button control of a main or series-parallel electromagnetic switch device, and such magnetic contactor has been the source of considerable trouble in cases where the contacts thereof become stuck together in their closed position during the cranking operation, that is, during the discharge of the batteries in their series connected relation.

In such previous arrangements, the release of the push button switch normally results in the return of the main or series-parallel switch device to its initial position for re-establishing the parallel connected charging relation for the batteries. However, when the above-mentioned stuck condition exists at the contacts of the magnetic contactor, the return of the main switch to its initial position results in a very damaging short-circuited flow of battery current through the cranking motor and through the re-closed contacts of the main switch.

The present invention satisfactorily eliminates this difficulty and, as another of its objects, provides a novel series-parallel switch device and series-parallel circuit in which the functioning of the two separate electromagnetic switch devices previously required are combined in a single series-parallel switch device of a relatively simple and compact construction.

A further object is to provide novel series-parallel apparatus of the character referred to in which there are multiple pairs of high-current and low-current stationary contacts and which also has movable contact members engageable with either the high-current or the low-current stationary contacts in response to actuation by a common actuating means.

Still another object is to provide novel series-parallel apparatus of the character mentioned in which the movable contact members constitute bridge contacts which are used in the charging circuit as well as in the cranking or discharge circuit and eliminate the need for any current-carrying armature hinge springs or flexible shunts which are usually the source of operational difficulties.

It is also an object of this invention to provide series-parallel apparatus of the kind above indicated in which the actuating means for the movable contact members includes spring means effective on such contact members for causing one of the movable contact members to be held in its open position whenever a stuck engagement of the other movable contact member with its associated high-current contacts prevents the return of such other movable contact member to its initial or charging position in engagement with its associated low-current contacts.

As an additional object this invention provides a novel series-parallel switch device in which a pair of double-pole double-throw switches in tandem relation have paired high-current and low-current stationary contacts and bridge contacts movable between such paired high-current and low-current stationary contacts, and in which an actuating rod common to the movable bridge contacts is shiftable in one direction by an electromagnet and in the opposite direction by a return spring means and has operative connection with the bridge contacts through pairs of interposed springs.

The invention can be further briefly summarized as consisting in certain novel combinations and arrangements of parts hereinafter described and particularly set out in the claims hereof.

In the accompanying sheets of drawings,

Fig. 1 is an external side elevation of a series-parallel electric switch device embodying the present invention;

Fig. 2 is an end view of such series-parallel switch device;

Figure 3:
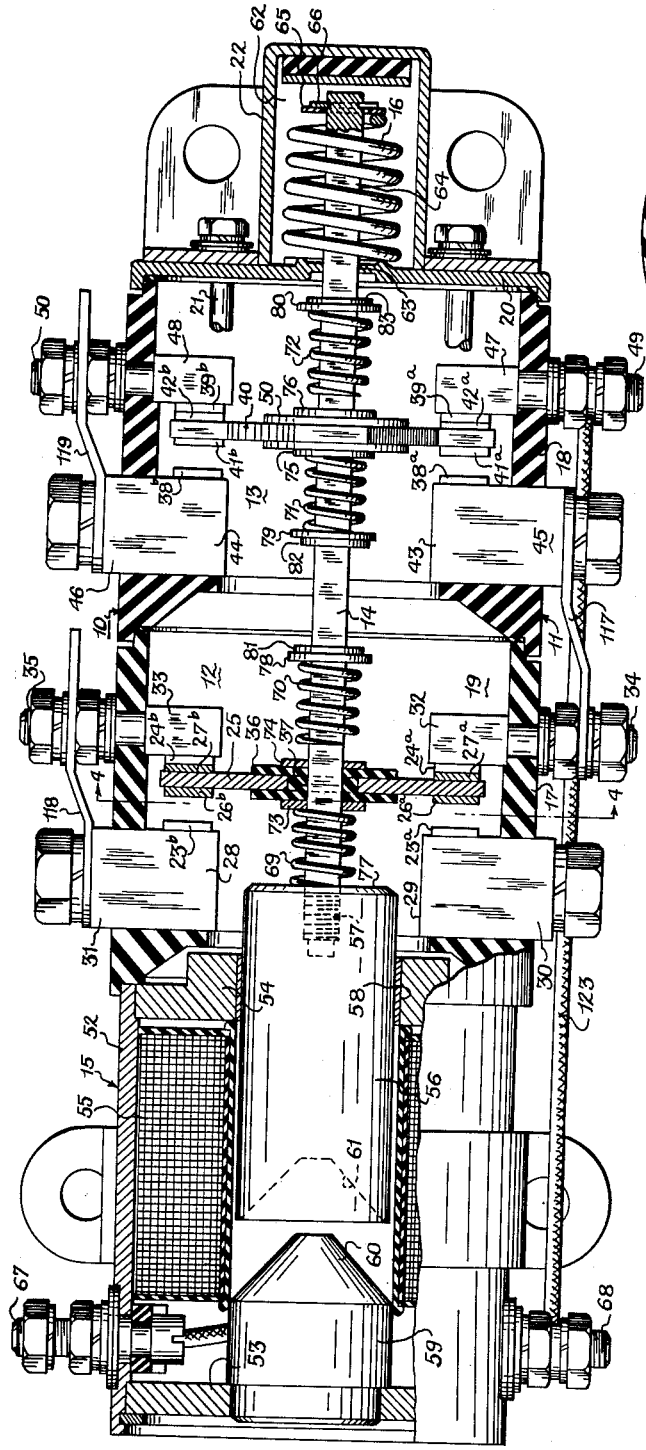
Fig. 3 is a longitudinal section taken through the series-parallel switch device as indicated by section line 3—3 of Figs. 1 and 2.
Figure 4:
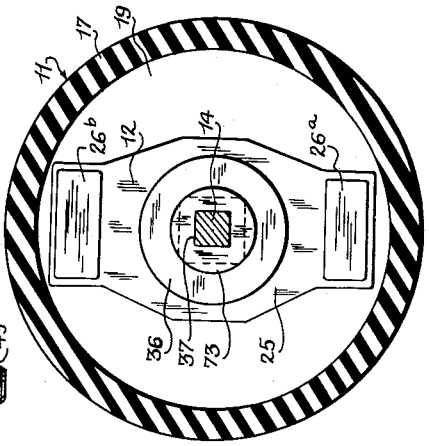
Fig. 4 is a transverse section taken through the series-parallel switch device as indicated by section line 4—4 of Fig. 3.

The novel series-parallel switch device 10 of this invention comprises, in general, an elongated tubular housing 11 having a pair of double-pole double-throw switches 12 and 13 in tandem relation therein and an actuating means for the switches 12 and 13 comprising an axially movable common actuating rod 14 adapted to be shifted in one direction by a solenoid magnet 15 and in the opposite direction by a return spring 16.

The housing structure 11 comprises a pair of coaxially aligned cylindrical housing members 17 and 18 which are molded or otherwise formed from suitable electrical insulating material and in which the switches 12 and 13 are located respectively. The housing members 17 and 18 have their adjacent ends in interfitting engagement for maintaining these members in axially aligned relation to define a longitudinally continuous switch chamber 19 through which the common actuating rod 14 extends. The solenoid magnet 15 is located at one end of the housing 11 and forms a closure for the outer end of the housing member 17.

A cover 20 in provided at the opposite end of the housing 11 and forms a closure for the outer end of the housing member 18. Tie rods 21 extending longitudinally through the housing 11 connect the solenoid magnet 15 with the cover 20 and exert a clamping action on the housing members 17 and 18 for holding the latter in the connected axially aligned relation. A substantially cup-shaped member 22 connected with the cover 20 forms a hollow axial extension of the housing 11 in which the return spring 16 is located.

The double-pole double-throw switch 12 comprises a pair of stationary high-current contacts 23$^a$ and 23$^b$ spaced apart transversely of the switch chamber 19 and a pair of stationary low-current contacts 24$^a$ and 24$^b$ which are also spaced apart transversely of the switch chamber and are located in axially opposed relation to the stationary high-current contacts. The switch 12 also comprises a movable contact member 25 extending transversely of the switch chamber 19 and movable between the pairs of opposed stationary high-current contacts and low-current contacts. The movable contact member 25 comprises a flat bar of conducting material which is provided on one side thereof and adjacent its ends with contacts 26ᵃ and 26ᵇ for engagement with the stationary high-current contacts 23ᵃ and 23ᵇ. This movable contact member is also provided on its opposite side and adjacent its ends with a pair of contacts 27ᵃ and 27ᵇ for engagement with the stationary low-current contacts 24ᵃ and 24ᵇ.

The stationary high-current contacts 23ᵃ and 23ᵇ are carried by a pair of terminal bodies 28 and 29 which extend through the side wall of the insulating housing member 17 substantially diametrically thereof for mounting the high-current contacts on this housing member and have portions projecting outwardly of this housing member to provide external terminals 30 and 31 thereon. The stationary low-current contacts 24ᵃ and 24ᵇ are carried by a pair of terminal bodies 32 and 33 which are supported in substantially diametrically aligned relation by the housing member 17 and have stem portions which extend through the wall of this housing member to form external terminals 34 and 35.

The movable contact member 25 of the switch 12 is supported by the actuating rod 14 by means of an insulating bushing 36 mounted in this contact member and having an opening 37 through which the actuating rod extends. The opening 37 is of a non-circular shape, in this instance a square opening, and the actuating rod 14 is of a corresponding non-circular or square shape so as to provide an interlock between the contact member and actuating rod such that the contact member will be held in by the rod in properly aligned relation with respect to the pairs of stationary contacts 23ᵃ, 23ᵇ and 24ᵃ, 24ᵇ. The operating connection between the contact member 25 and the actuating rod 14 is not a fixed connection, but for a purpose which will presently appear, the actuating rod is capable of limited sliding movement in the opening 37 of the bushing 36.

The switch 13 is of a construction substantially identical with the switch 12 and comprises a pair of stationary high-current contacts 38ᵃ and 38ᵇ, a pair of stationary low-current contacts 39ᵃ and 39ᵇ and a movable contact member 40 operable between these pairs of stationary high-current contacts and stationary low-current contacts and itself having pairs of contacts 41ᵃ, 41ᵇ and 42ᵃ, 42ᵇ on opposite sides thereof for engagement with the respective pairs of stationary contacts.

The stationary high-current contacts 38ᵃ and 38ᵇ are carried by terminal bodies 43 and 44 which extend through the side wall of the housing member 18 and have projecting portions forming external terminals 45 and 46 on this housing member. The stationary low-current contacts 39ᵃ and 39ᵇ are carried by terminal bodies 47 and 48 which have stem portions extending through the side wall of the housing member 18 and form external terminals 49 and 50 thereon.

The movable contact member 40 is mounted on the actuating rod 14 by means of an insulating bushing 51 also having a non-circular opening through which the rod extends and in which the rod has limited sliding movement. This movable contact member is provided on opposite sides thereof and adjacent its ends with pairs of contacts 41ᵃ, 41ᵇ and 42ᵃ, 42ᵇ for engagement with the respective pairs of stationary contacts 38ᵃ, 38ᵇ and 39ᵃ, 39ᵇ.

The solenoid magnet 15 comprises an outer magnetic shell or core member formed by a cylindrical member 52 and a pair of transverse end members 53 and 54. The solenoid magnet 15 also comprises a hollow magnet coil 55 and an inner core member 56 coaxially movable in the hollow magnet coil and having one end of the actuating rod 14 attached thereto as by means of the threaded connection 57. The inner end member 54 of the magnet shell has an opening 58 therein through which the inner core member 56 is axially movable.

The outer end member 53 of the magnet shell carries a stationary core member 59 which extends axially of the magnet and is disposed in aligned relation with the movable core member 56. The core member 59 forms a stop which is adapted to be engaged by the outer end of the movable core member 56 and is here shown as having a convergently tapered substantially conical inner end portion 60. The outer end of the movable core member 56 has a similarly shaped convergently tapered substantially conical recess 61 therein which receives and substantially fits the tapered end portion 60 when the movable core member engages the stationary core member 59.

The opposite or remote end of the actuating rod 14 projects through the cover 20 into the spring chamber 62 of the cup-shaped housing extension 22 and is slidable in a substantially square opening 63 of the cover. The spring 16 is disposed around the outwardly projecting end portion 64 of the rod 14 and has one end thereof in seating engagement with the cover 20 and its other end seated against a shoulder carried by the rod and which shoulder is, in this instance, formed by a washer 65 carried by the rod and retained thereon by a spring ring 66 engaging in a groove of the rod.

With the construction and arrangement described above, it will be seen that the movable contact members 25 and 40 of the switches 12 and 13 are normally held in cooperating relation with the pairs of stationary low-current contacts 24ᵃ, 24ᵇ and 39ᵃ, 39ᵇ by the expansive action of the spring 16. When the magnet coil 55 of the solenoid magnet 15 is energized, the core member or plunger 56 is shifted toward the left as seen in Fig. 3 into engagement with the stationary core member 59 and a similar movement imparted to the actuating rod 14 by the movable core member causes the movable contact members 25 and 40 to be moved into cooperating engagement with the pairs of stationary high-current contacts 23ᵃ, 23ᵇ and 38ᵃ, 38ᵇ. During this movement of the movable contact members 25 and 40 into engagement with the stationary high-current contacts 23ᵃ, 23ᵇ and 38ᵃ, 38ᵇ the spring 16 is compressed by the shoulder 65 of the actuating rod 14 such that when the coil 55 is de-energized, this spring will cause a return movement of the actuating rod for shifting the movable contact members 25 and 40 back to their initial or normal position in engagement with the stationary low-current contacts 24ᵃ, 24ᵇ and 39ᵃ, 39ᵇ.

Energization of the magnet coil 55 is produced by supplying current thereto through the terminal members 67 and 68 which are mounted on the outer shell member 52 in insulated relation thereto and with which the ends of the magnet coil are electrically connected.

An important part of the series-parallel switch device 10 is represented by the operating connections between the actuating rod 14 and the movable contact members 25 and 40 of the switches 12 and 13. In addition to the above described non-circular slidable engagement between the actuating rod and the bushings 36 and 50 of these movable contact members, these operating connections also comprise pairs of centering compression springs surrounding the actuating rod and located on opposite sides of the movable contact members. A pair of such compression springs 69 and 70 serve the movable contact member 25 and a similar pair of such compression springs 71 and 72 serve the movable contact member 40.

The adjacent ends of the springs 69 and 70 are engageable with thrust washers 73 and 74 which are located on opposite sides of the insulating bushing 36. The adjacent ends of the springs 71 and 72 are engageable with similar thrust washers 75 and 76 located on opposite sides of the insulating bushing 50. The outer end of the spring 69 is engageable with an abutment formed by the adjacent end face 77 of the movable core member 56. The outer ends of the springs 70, 71 and 72 are engageable respectively with spring seats or abutments formed by washers 78, 79 and 80 which are retained in a fixed relation on the actuating rod 14 by means of spring retaining rings 81, 82 and 83.

The location of the springs 69 and 70 of the actuating rod 14 is such that the axial spacing of the adjacent ends of these springs provides a lost-motion operating connection between the actuating rod and the movable contact member 25. Similarly, the location of the springs 71 and 72 is such that the axial spacing of the adjacent ends of these springs provides a lost-motion operating connection between the actuating rod and the movable contact member 40. The characteristics of the springs 69, 70, 71 and 72 are such in relation to the characteristics of the spring 16 that when the movable contact members 25 and 40 are held in engagement with the stationary low-current contacts 24a, 24b and 39a, 39b by the spring 16, the springs 69 and 71 will themselves be partially compressed by the expansive force of the spring 16.

When the solenoid magnet 15 is energized and shifts the core member 56 and the actuating rod 14 toward the left, the initial movement of the actuating rod releases the compressive force on the springs 69 and 71 and also moves the springs 70 and 72 to engage the same with the spring seats 74 and 76 of the movable contact members 25 and 40. During the subsequent movement of the actuating rod 14 toward the left, the compression of the springs 69 and 71 is further released while the springs 70 and 72 impart movement to the contact members 25 and 40 to shift the latter out of engagement with the stationary low-current contacts 24a, 24b and 39a, 39b and into engagement with the stationary high current contacts 23a, 23b and 38a, 38b.

Upon engagement of the movable contact members 25 and 40 with the stationary high-current contacts 23a, 23b and 38a, 38b the springs 70 and 72 will be compressed by the spring seats 78 and 80 of the actuating rod and the compressive force of the springs 69 and 71 will be further released until these springs are disengaged from the spring seats 73 and 75. So long as the solenoid magnet 15 remains energized, the movable contact members 25 and 40 will be held against the stationary high-current contacts 23a, 23b and 38a, 38b and the springs 16, 70 and 72 will be maintained under compression.

Whenever the movable contact members 25 and 40 are in engagement with the pairs of stationary contacts 23a, 23b and 38a, 38b they form bridging contacts between the stationary contacts of the respective pairs. Similarly, whenever the movable contact members 25 and 40 are in engagement with the pairs of stationary low-current contacts 24a, 24b and 39a, 39b they form bridging contacts between the respective pairs of these stationary low-current contacts. If the current flow through the movable contact members 25 and 40 results in sticking of either of these movable contact members in its engaged relation with the stationary contacts bridged thereby, such as might occur particularly when the movable contact members are in engagement with the stationary high-current contacts 23a, 23b and 38a, 38b an important operating function takes place which will now be described.

Let it be assumed that the energization of the solenoid magnet 15 has resulted in movement of the movable contact members 25 and 40 into engagement with the stationary high-current contacts 23a, 23b and 38a, 38b and that a heavy flow of current through the movable contact members has resulted in sticking of the contacts 26a and 26b of the movable contact member 25 against the stationary contacts 23a and 23b. Upon deenergization of the solenoid magnet 15, the compression spring 16 will move the actuating rod 14 toward the right, as explained above, and will endeavor to shift the movable contact members 25 and 40 back to their initial position in engagement with the stationary low-current contacts 24a, 24b and 39a, 39b but the stuck condition of the contacts of the movable contact member 25 prevents this from being carried out.

During this stuck-contact condition, the expansive forces of the springs 16, 69 and 71 are effective on the actuating rod 14 and are balanced against each other so as to bring about a resultant movement of the actuating rod toward the right through a sufficient distance to disengage the movable contact member 40 from the stationary high current contacts 38a and 38b, but not sufficient to reengage this movable contact member with the stationary low-current contacts 39a and 39b. This will leave the series-parallel switch device 10 in a disabled condition in which the movable contact member 40 will be disconnected from both pairs of stationary contacts 38a, 38b and 39a, 39b such that it will not be possible for a damaging short-circuit current to flow through this movable contact member so long as the movable contact member 25 remains in its stuck condition.

It will be understood of course, that if the stuck condition occurs between the engagement of the movable contact member 40 and the stationary high-current contacts 38a, 38b the resultant effect of the springs will be to position and hold the movable contact member 25 at a location intermediate the pairs of stationary contacts 23a, 23b and 24a, 24b to similarly disable the series-parallel switch device 10.

With respect to the springs 69, 70, 71 and 72 it should also be explained that these springs have been designed to provide optimum pressures on the contacts of the switch 10. Thus when the values of voltage drop across the contacts are plotted against the values of contact pressure provided by the springs and the solenoid magnet 15, the operation of the switch 10 occurs substantially as would be represented on the curve by the point of diminishing returns.

Figure 5:
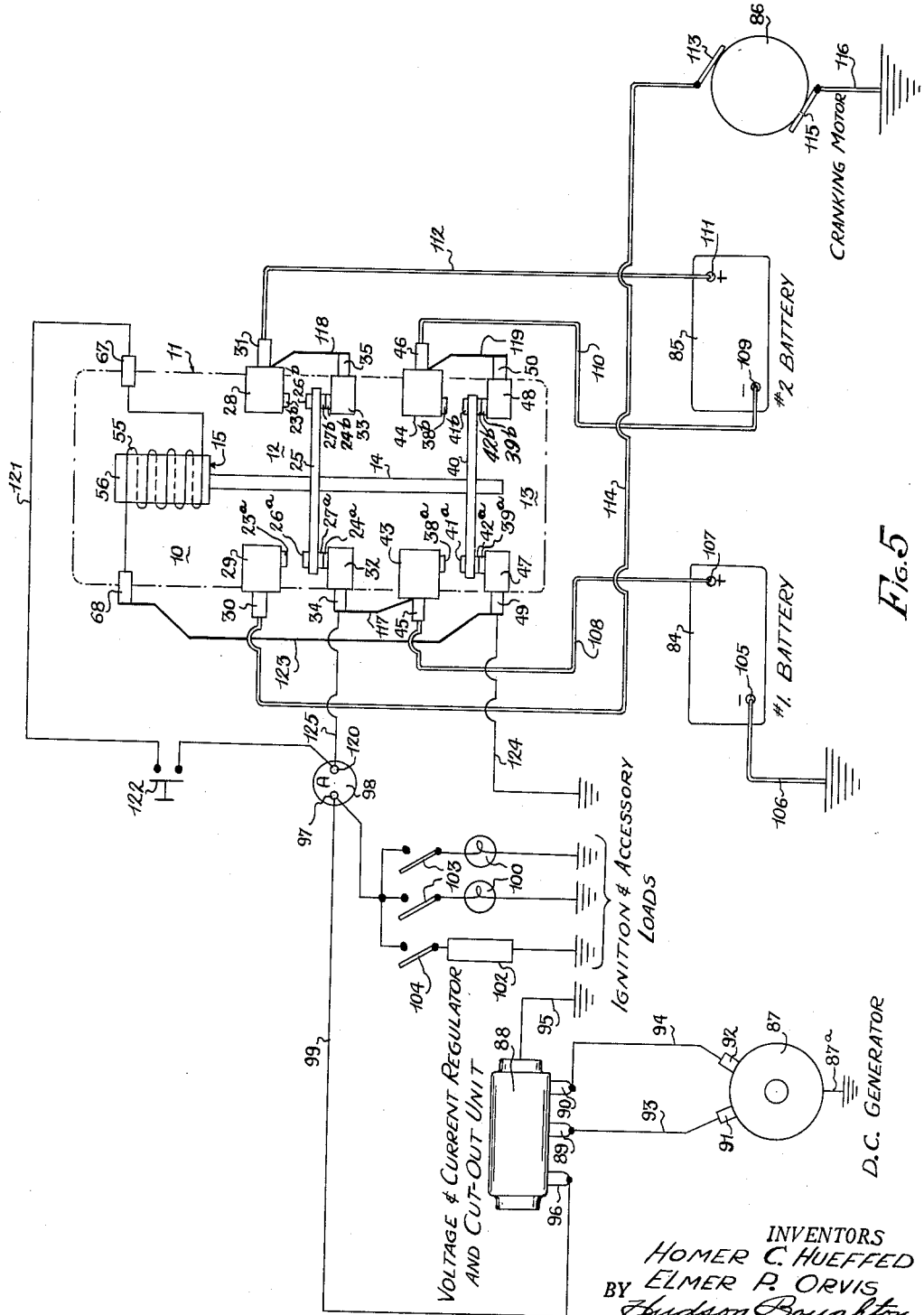
Fig. 5 is a diagram further illustrating the series-parallel switch device and also showing the novel series-parallel circuit of the present invention.

Fig. 5 of the drawings shows a novel series-parallel circuit embodying the series-parallel switch 10 described above. The series-parallel circuit is here shown as forming a part of a vehicle electrical system of the kind which includes a pair of storage batteries 84 and 85, an engine cranking motor 86 adapted to be supplied with current by the batteries and a direct current generator 87 for charging the batteries. The generator 87 is driven by the same engine as that which is served by the cranking motor 86.

The vehicle electrical system here shown also includes a conventional regulator and cutout unit 88 having a pair of terminals 89 and 90 with which the armature and field terminals 91 and 92 of the generator 87 are connected by the conductors 93 and 94. The return paths for the armature and field circuits of the generator are through the ground connection 87a. The cutout unit 88 also includes a ground connection 95 and a terminal 96 which is connected with the terminal post 97 of an ammeter 98 by the conductor 99. The external load being supplied by the electrical system may also include various auxiliary and accessory devices, such as the lamps 100 and an ignition coil or apparatus 102. The lamps 100 are connected with the terminal post 97 of the ammeter 98 through manually operable switches 103 and the ignition apparatus 102 is also connected with the terminal post 97 of the ammeter through an ignition switch 104.

The voltage and current regulators of the unit 88 are conventional regulators which control the operation of the generator 87 in a manner understood by those skilled in this art and the cutout device of the unit 88 is likewise a conventional relay which automatically disconnects the generator from the circuit in the usual way to prevent discharge of the batteries through the generator when the latter is not producing current.

As a part of this novel series-parallel circuit, Fig. 5 shows the storage battery 84 as having its end terminal 105 connected with ground by the conductor 106. The other end terminal 107 of this battery is connected with the stationary high-current contact 38a of the switch 13 by a conductor 108. The end terminal 109 of the battery 85 is connected with the other stationary high-current contact 38ᵇ of the switch 13 by a conductor 110. The other end terminal 111 of the battery 85 is connected with the stationary high-current contacts 23ᵇ of the switch 12 by a conductor 112. The stationary high-current contact 23ᵃ of the switch 12 is connected with the brush 113 of the cranking motor 86 by a conductor 114. The other brush 115 of the cranking motor 86 is connected with ground by the conductor 116.

The stationary low-current contact 24ᵃ of the switch 12 is connected with the stationary high-current contact 38ᵃ of the switch 13 by a bridging conductor 117. The other stationary low-current contact 24ᵇ of the switch 12 is connected with the adjacent stationary high-current contact 23ᵇ of this switch by a bridging conductor 118. Similarly, the stationary low-current contact 39ᵇ of the switch 13 is connected with the adjacent stationary high-current contact 38ᵇ of this switch by a bridging conductor 119.

For energization of the coil 55 of the solenoid magnet 15, the terminal 67 of this magnet is connected with the terminal post 120 of the ammeter 98 by a conductor 121 in which is located a normally open push button switch 122. The other terminal 68 of the solenoid magnet 15, is connected with the stationary high-current contact 39ᵃ of the switch 13 by a bridging conductor 123 and this stationary high-current contact is in turn connected with ground by a conductor 124.

In the normal position of the series-parallel switch device 10 as shown in Fig. 5, the pairs of stationary low-current contacts 24ᵃ, 24ᵇ and 39ᵃ, 39ᵇ of the switches 12 and 13 are closed by the movable contact members 25 and 40 to complete the parallel charging circuit for the batteries 84 and 85. At this time, the current being delivered by the generator 87 flows through the conductor 99 and the ammeter 98, and through the conductor 125 to the stationary low-current contact 24ᵃ of the switch 12, and then to the terminal 107 of the storage battery 84 through the conductors 117 and 108. The charging circuit thus being traced for the battery 84 is completed through the battery ground connection 106 and through the ground connection 95 back to the generator 87.

A portion of the charging current being supplied by the generator 87 to the stationary low-current contact 24ᵃ of the switch 12 passes through the contact member 25 to the stationary low-current contact 24ᵇ of this switch and then through the conductors 118 and 112 to the terminal 111 of the battery 85. From the terminal 109 of this battery, the charging current then flows through the conductor 110 and the conductor 119 to the stationary low-current contact 39ᵇ of the switch 13. From this contact the current then flows through movable contact member 40 to the other stationary low-current contact 39ᵃ of this switch and then through the ground connections 124 and 95 back to the generator 87.

From the charging circuits just above traced for the batteries 84 and 85, it will accordingly be seen that when the movable contact members 25 and 40 of the series-parallel switch device 10 are in the position shown in Fig. 5, the batteries will be charged by the generator 87 in a parallel connected relation and at a relatively low voltage, as for example 12 volts.

When the cranking motor 86 is to be energized by the batteries 84 and 85 in a series-connected relation so as to supply the cranking motor with current at a relatively higher voltage, such as 24 volts, the push button switch 122 is manually closed and is held closed for the period of the desired cranking operation. The closing of the push button switch 122 completes the energizing circuit for the coil 55 of the solenoid magnet 15 to thereby actuate the core member 56 and the rod 14, in an upward direction as seen in Fig. 5, to open the low-current or charging contacts of the series-parallel switch device 10 and close the high-current contacts or discharge contacts of this switch device. The opening of the charging contacts disables the charging circuit for battery 85 without disabling the charging circuit for the battery 84 which supplies the current for the auxiliary devices 100 and 102, and the closing of the discharge contacts causes a discharge circuit to be established by which the batteries 84 and 85 are connected in the above-mentioned series-connected relation with the cranking motor 86.

This series discharge circuit can be traced from the terminal 107 of the battery 84 through the conductor 108 and through the stationary high-current contacts 38ᵃ and 38ᵇ of the switch 13 and the movable contact member 40 and then through the conductor 110 to the battery 85. From this battery, the discharge circuit continues through the conductor 112 through the stationary high-current contacts 23ᵇ and 23ᵃ and the movable contact member 25 of the switch 12, and then through the conductor 114 to the cranking motor 86. This discharge circuit is completed through the ground connection 116 of the cranking motor and back to the battery 84 through the ground connection 106.

When the cranking operation is completed, the push button switch 122 is released to thereby deenergize the coil 55 of the solenoid magnet 15 and permit the discharge contacts of the series-parallel switch device 10 to be opened and the charging contacts thereof to be reclosed by the action of the return spring 16.

From the showing of the batteries 84 and 85 as illustrated in Fig. 5, and from what has been explained above with respect to the voltages and circuit connections of such batteries, it will be understood that these batteries, as contemplated in this invention, are batteries of approximately equal end terminal voltage rating.

The vehicle electrical system here shown is a negative ground system, but obviously, the invention is also applicable to a positive ground system.

From the foregoing detailed description and the accompanying drawings, it will now be readily understood that this invention provides a novel series-parallel circuit and switch device which is greatly simplified as compared with the series-parallel switch mechanisms and circuits heretofore used in vehicle electrical systems. It will now also be seen that in this novel series-parallel apparatus a single electromagnetic series-parallel switch device is used and accomplishes all of the functions previously performed by the plurality of electromagnetic series-parallel switch devices and accomplishes such combined functions in a much more efficient and satisfactory manner.

Additionally, it will be seen that whenever a stuck condition of one set of the charging contacts occurs, the movable contact member of the other set of switch contacts will be prevented from returning to the charging position when the cranking operation is discontinued and thus the destructive short-circuiting condition, which would otherwise result from such stuck condition, is prevented and the series-parallel switch device and circuit is disabled until the stuck condition can be corrected.

It will be now also be seen that the novel series-parallel switch device of this invention embodies tandem switches having movable contact members and a common actuating means for such movable contact members for shifting the same between their charging and discharging positions. It will now be further understood in connection with this series-parallel switch device that the spring means associated with the common actuating means and the movable contact members is effective to produce a resultant condition such that when one of the movable contact members becomes stuck in the discharging position, the other movable contact member will be held in the open position mentioned above for preventing a short-circuit upon completion of the cranking operation.

Although the novel series-parallel circuit and switch device of this invention have been illustrated and described herein to a somewhat detailed extent, it will be understood of course, that the invention is not to be regarded as being limited correspondingly in scope but includes all changes and modifications coming within the terms of the claims hereof.

Having thus described our invention, we claim:

1. In a battery circuit of the character described, a pair of batteries, a load to be energized from said batteries in series-connected relation, a source of current of a voltage suitable for charging said batteries in parallel-connected relation, a pair of double-pole double-throw switches each having a pair of high-current contacts located in substantially opposed relation to a pair of low-current contacts and a bridging contact movable between the pairs of high- and low-current contacts, circuit connections connecting said high-current contacts with said load and with the terminals of said batteries for energization of the load by said batteries in series-connected relation when said high-current contacts are closed by said bridging contacts, circuit connections for connecting said batteries in parallel charging relation with said source when said low-current contacts are closed by said bridging contacts, a movable actuating member, double-acting yieldable operating connections connecting said bridging contacts with said actuating member for actuation thereby, and spring means effective on said actuating member for urging said bridging contacts toward said low-current contacts.

2. In a battery circuit of the character described, a pair of storage batteries, a load to be energized from said batteries in series-connected relation, a source of current of a voltage suitable for charging said batteries in parallel-connected relation, a pair of double-pole double-throw switches each having a pair of high-current contacts located in substantially opposed relation to a pair of low-current contacts and a bridging contact movable between the pairs of high- and low-current contacts, circuit connections connecting said high-current contacts with said load and with the terminals of said batteries for energization of said load by said batteries in series-connected relation when said high-current contacts are closed by said bridging contacts, circuit connections for connecting said batteries in parallel charging relation with said source when said low-current contacts are closed by said bridging contacts, a movable actuating member, double-acting spring means connecting said bridging contacts with said actuating member for yieldable actuation thereby, and return spring means effective on said actuating member for urging said bridging contacts toward said low-current contacts, the characteristics and resultant effect of said double-acting spring means and said return spring means being such that upon the occurrence of a stuck engagement of one of said bridging contacts with its associated high-current stationary contact or contacts the other bridging contact will be shifted to an open position intermediate its associated high-current and low-current stationary contacts.

3. In a battery circuit of the character described, a pair of storage batteries, a load to be energized from said batteries in series-connected relation, a source of current of a voltage suitable for charging said batteries in parallel-connected relation, a pair of double-pole double-throw switches each having a pair of high-current contacts located in substantially opposed relation to a pair of low-current contacts and a bridging contact movable between the pairs of high- and low-current contacts, circuit connections connecting said high-current contacts with said load and with the terminals of said batteries for energization of said load by said batteries in series-connected relation when said high-current contacts are closed by said bridging contacts, circuit connections for connecting said batteries in parallel charging relation with said source when said low-current contacts are closed by said bridging contacts, an axially movable actuating rod common to said bridging contacts and having limited movements relative thereto, paired springs disposed on opposite sides of said bridging contacts and forming yieldable operating connections between said rod and said bridging contacts, an electromagnet operable when energized to impart movement to said rod in one direction for engaging said bridging contacts with said high-current stationary contacts, and return spring means located so as to be stressed during movement of said rod in said one direction and effective on said rod for moving the same in the opposite direction to cause said bridging contacts to disengage said high-current stationary contacts and to engage said low-current stationary contacts upon deenergization of said electromagnet, the characteristics and resultant effect of said paired springs and said return spring means being such that upon the occurrence of a stuck engagement of one of said bridging contacts with its associated high-current stationary contact or contacts the other bridging contact will be shifted to an open position intermediate its associated high-current and low-current stationary contacts.

References Cited in the file of this patent

UNITED STATES PATENTS

| Number | Name | Date |
| --- | --- | --- |
| 983,976 | Carpenter | Feb. 14, 1911 |
| 996,973 | Carpenter | July 4, 1911 |
| 1,689,075 | Lehman | Oct. 23, 1928 |
| 1,793,858 | Lake | Feb. 24, 1931 |
| 2,085,275 | Schmidt | June 29, 1937 |
| 2,096,378 | Mitchell | Oct. 19, 1937 |
| 2,344,568 | Snyder | Mar. 21, 1944 |
| 2,521,969 | Dugan | Sept. 12, 1950 |
| 2,564,957 | Cermak | Aug. 21, 1951 |